US006445756B1

(12) United States Patent
Takahashi

(10) Patent No.: US 6,445,756 B1
(45) Date of Patent: Sep. 3, 2002

(54) PEAK DETECTING CIRCUIT FOR DETECTING A PEAK OF A TIME DISCRETE SIGNAL BY AN APPROXIMATE FUNCTION

(75) Inventor: Satoshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/241,290

(22) Filed: Feb. 1, 1999

(30) Foreign Application Priority Data

Feb. 2, 1998 (JP) ............................................ 10-020846
Sep. 29, 1998 (JP) ............................................ 10-275511

(51) Int. Cl.[7] ............................ H03D 1/00; H04L 27/06
(52) U.S. Cl. ........................ 375/343; 375/152; 375/143; 327/58; 708/314
(58) Field of Search ................................ 375/142, 143, 375/150, 151, 152, 153, 343; 702/105; 327/50, 58, 62; 708/314, 422, 426

(56) References Cited

U.S. PATENT DOCUMENTS

| 4,805,125 A | * | 2/1989 | Beebe ......................... 702/105 |
| 5,276,706 A | * | 1/1994 | Critchlow ................... 375/343 |
| 5,293,870 A | | 3/1994 | Ophir et al. |
| 5,311,544 A | * | 5/1994 | Park et al. .................. 375/206 |
| 5,345,472 A | | 9/1994 | Lee |
| 5,375,141 A | | 12/1994 | Takahashi |
| 5,469,470 A | | 11/1995 | Takahashi |

FOREIGN PATENT DOCUMENTS

| EP | 0 392 263 | 7/1999 |
| JP | 09-501032 | 1/1997 |

OTHER PUBLICATIONS

W. W. Jones, et al., Proceeding of the Military Communications Conference (MILCOM), IEEE, vol. 2 of 3, pps. 804–808, "Post Acquisition PN Code Uncertainty Reduction by Least–Square Interpolation," 1991.
S. G. Foster, et al., IEEE Transactions on Ultrasonics, Ferroelectrics, and Frequency Control, vol. 37, No. 3, pps. 164–175, "Flow Velocity Profile Via Time–Domain Correlation: Error Analysis and Computer Simulation," May 1, 1990.

* cited by examiner

*Primary Examiner*—Phuong Phu
(74) *Attorney, Agent, or Firm*—Oblon, Spivak, McClelland, Maier & Neustadt, P.C.

(57) ABSTRACT

A peak detecting circuit capable of accurately detecting a peak of a time discrete signal without increasing a circuit scale. The peak detecting circuit detects a peak of a waveform of a time discrete signal by calculating an approximate function which approximates the waveform of the time discrete signal. A peak of the approximate function is detected according to parameters of the approximate function so that the peak of the approximate function is estimated as the peak of the waveform of the time discrete signal.

13 Claims, 15 Drawing Sheets

SAMPLE TIMING

PEAK DETECTING CIRCUIT FOR DETECTING A PEAK OF A TIME DISCRETE SIGNAL BY AN APPROXIMATE FUNCTION

BACKGROUND OF THE INVENTION

1. Field of the Invention

The present invention generally relates to a peak detecting circuit applicable to a spread spectrum technique used for a radio frequency communication system, a distance measurement system or a positioning system and, more particularly, to a correlation peak detecting circuit for detecting a correlation peak in a spread spectrum signal.

2. Description of the Related Art

FIG. 1 is a block diagram of a digital matched filter 200 used in a conventional spread spectrum circuit. The digital matched filter 200 shown in FIG. 1 comprises a shift register 201, a plurality of multipliers 202 each of which multiplies a signal input from the shift register 201 by a tap coefficient and a summing circuit 203 which sums output signals of the multipliers 202. Normally, the tap coefficient is either +1 or −1 when a correlation of a pseudo noise (PN) signal is obtained.

As appreciated from FIG. 1, since the digital matched filter 200 is constituted by a sequence circuit including the shift register 201 and other parts, a time discrete signal which may be produced by sampling by an A/D converter and the like must be input to the digital matched filter 200.

When the PN signal is subjected to a discrete signal producing process such as a sampling process, the autocorrelation characteristic of the processed PN signal differs from the original characteristic. FIGS. 2A, 2B and 2C show examples of correlation characteristics represented by a correlation output with respect to a phase shift $\Delta\tau$ from a reference phase. FIG. 2A shows an example of an original correlation characteristic; FIG. 2B shows a correlation characteristic when a discrete PN signal is input; FIG. 2C shows a correlation characteristic when a discrete PN signal produced by sampling under a bandwidth restriction is input. It should be noted that, in FIG. 2B, two samples are taken per one chip timing. For the sake of convenience, two samples are taken per one chip timing for all cases described below.

FIGS. 3A to 3E show examples of outputs of a matched filter when a discrete PN signal is input to the matched filter.

FIG. 3A shows an example of output of an analog matched filter. As shown in FIG. 3A, the analog matched filter outputs a signal pulse for each single cycle of the input PN signal.

FIG. 3B shows an example of output of a digital matched filter. In the example of FIG. 3B, the envelope of the signals output from the digital matched filter is the same as that of the analog matched filter shown in FIG. 3A. However, the output itself is discrete. This is because a shift register of the digital matched filter also performs a discrete shifting process in synchronization with a sampling clock of the A/D converter.

Accordingly, a largest peak signal and two peak signals having a level which is one half of the largest peak signal must always be obtained from the correlation output using the digital matched filter for each cycle as shown in FIG. 3B irrespective of a sampling timing. However, in practice, the signal to be input to the digital matched filter is influenced by a bandwidth restriction.

FIG. 4A shows an example of the PN signal transmitted by a sender. FIG. 4B shows a correlation characteristic when the PN signal shown in FIG. 4A is input to the digital matched filter.

As shown in FIG. 4B, the PN signal input to the digital matched filter is blunted or dulled due to a bandwidth restriction according to a legal regulation or a system performance. The blunted or dulled signal is subjected to a sampling process, and a waveform as shown in FIG. 4C or 4D is obtained and input to the digital matched filter.

Accordingly, the correlation characteristic of the sampled PN signal becomes different from that of the input signal shown in FIG. 4B. Thus, in a case of the digital matched filter, the output of the digital matched filter becomes as shown in FIG. 3C. Naturally, the output characteristic of the digital matched filter can be a characteristic as shown in either FIG. 3D or FIG. 3D which has an envelop equivalent to the characteristic shown in FIG. 3C.

As appreciated from the above-mentioned example, when the PN signal subjected to the bandwidth restriction is sampled and is input to the digital matched filter, the correlation output varies according to the sample timing and the output signal pulses do not always represent a value of the correlation peak. Additionally, there is a problem in that a time when a largest peak pulse from among the signal pulses appears is varied.

Accordingly, in a communication system merely using a digital matched filter, it is required to set a threshold value for detecting the correlation peak to match a lowest value of the correlation output. Additionally, a time when a correlation peak appears cannot be estimated. This results in deterioration in the transmission characteristic.

In the spread spectrum communication, an information signal is transmitted by being multiplied by a PN signal having a sufficiently high speed. On a receiver side, the information signal spread by the PN signal is processed by a matched filter or a sliding correlator so as to enable a demodulation process.

Particularly, in a case in which the reception signal is input to the matched filter, a code system the same as the PN signal used for spreading the information signal on the sender side is set to a set of coefficients used by the matched filter. Thereby, when the spread information signal is input to the matched filter, the matched filter outputs peak signals having a sharp peak as shown in FIG. 5A. The receiver side detects a time when the peak signal appears so as to detect a phase of the received signal.

However, FIG. 5A shows an ideal case, and, in practice, the received signal is influenced by a bandwidth restriction and the waveform of the received signal is blunted or dulled. Accordingly, the correlation characteristic becomes as shown in FIG. 5B.

In order to constitute a matched filter, an analog system using a SAW filter and the like or a digital system can be used. The digital system has an advantage over the analog system with respect to cost and size since the digital system can be achieved by an integrated circuit.

FIG. 6 shows a structure of a conventional digital matched filter (DMF). The digital matched filter shown in FIG. 6 comprises a plurality of delay elements 211, a plurality of multipliers 212 and an adder 213 which sums outputs of the amplifiers 212. Each of the delay elements 211 delays an inputting timing corresponding to a single cycle. Each of the multipliers 212 multiplies an output of the corresponding delay element by a coefficient hi (i=1 to m). The coefficient hi takes either a value of +1 or −1.

Since the DMF is constituted by a digital circuit, the signal input thereto is a discrete signal which is obtained by sampling the received signal at every predetermined time. Additionally, the received signal is quantized in response to a dynamic range of the input signal. Hereinafter, an i-th sampled signal with respect to a reference time is represented by $X_i$.

The signal input to the DMF is delayed by a multi-bit shift register, and the following signals are output from the respective shift registers, where m is a number of shift registers.

$$\{X_{i-1}, X_{i-2}, X_{i-3}, \ldots, X_{i-m}\}$$

The output of each of the shift registers is multiplied by the respective coefficient, and summed by the adder 203. Accordingly, the output signal $y_i$ of the DMF is represented as follows.

$$Y_i = \sum_{j=1}^{m} h_i x_{i-j}$$

Accordingly, the output of the DMF is also the discrete signal $Y_i$. The output characteristic of the output $Y_i$ is a train of discrete signals as shown in FIG. 5C or FIG. 5D. That is, the train of signals shown in FIG. 5C or FIG. 5D is obtained by sampling the correlation characteristic shown in FIG. 5B. In the conventional technique, it is determined that the peak of the correlation characteristic appears at a time when a largest value of the signals appears in the characteristic shown in FIG. 5C or FIG. 5D.

When the conventional DMF is used, there are following problems.

1) When a dynamic range of the input signal is large, a large number of quantization bits of each shift register are required so as to represent the dynamic range. Additionally, a large number of bits are required for an arithmetic circuit in the DMF so as to handle pulse signals. Accordingly, there is a problem in that a large and complex circuit is required and an operation speed is reduced.

2) There is a possibility that an offset of the input signal fluctuates due to a temperature change and a change with respect to elapsed time.

3) When a correlation characteristic shown in FIG. 5B is represented by discrete signals, the output signal differs as shown in FIGS. 5C and 5D according to sample timing. This prevents an accurate detection of a peak.

Japanese Laid-Open Patent Application No. 9-501032 discloses a method for receiving and decoding communication signals in a CDMA receiver. In this method, the CDMA receiver is provided with a function of a digital matched filter equivalent so as to suppress influences of the correlation output to signals of other channels. However, in this method, the tap coefficients of the digital matched filter must be represented by a plurality of numbers each of which is represented by a plurality of bits. Accordingly, each of the multipliers in the digital matched filter must have a function of (multi-value input signal)×(multi-value tap coefficient). Thus, there is a problem in that the size of the circuit is large.

SUMMARY OF THE INVENTION

It is a general object of the present invention to provide an improved and useful peak detecting circuit and method in which the above-mentioned problems are eliminated.

A more specific object of the present invention is to provide a peak detecting circuit and method capable of accurately detecting a peak of a time discrete signal without increasing a circuit scale.

In order to achieve the above-mentioned object, there is provided according to the present invention a peak detecting circuit for detecting a peak of a waveform of a time discrete signal, the peak detecting circuit calculating an approximate function which approximates the waveform of the time discrete signal so as to detect a peak of the approximate function so that the peak of the approximate function is estimated as the peak of the waveform of the time discrete signal.

According to the present invention, the time discrete signal having a sharp peak is represented by the approximate function. The peak of the time discrete signal is detected as an extremum of the approximate function. Sine the approximate function can be represented by a quadratic polynominal, a peak value or a time when the peak value appears can be estimated by a simple calculation based on coefficients of the quadratic polynominal. Thus, the peak detecting circuit according to the present invention can be achieved by a simple circuit structure.

In one embodiment of the present invention, the time discrete signal is output from a digital matched filter to which a signal obtained by sampling a pseudo noise signal is input. The pseudo noise signal is subjected to a bandwidth restriction during transmission through a communication medium. The digital matched filter outputs the time discrete signal which represents an autocorrelation characteristic of the pseudo noise signal. According to the present invention, the autocorrelation characteristic is approximated by approximate function and a peak of the approximate function is estimated as a peak of the autocorrelation characteristic. Thus, a peak of the original pseudo noise signal can be obtained without being influenced by sample timing applied to the pseudo noise signal.

According to the present invention, a time when a correlation peak appears can be estimated by parameters of the approximate function. Additionally, a phase difference between sample timing and the pseudo noise signal can be detected based on the estimated time of appearance of the correlation peak. Thus, the sample timing can be matched to the time of appearance of the correlation peak. Additionally, since the time when the next correlation peak appears can be estimated, an output of the digital matched filter can be permitted only when the next correlation peak appears. That is, a so called window function can be applied to the correlation output. This eliminates influence of noise appearing during an interval of the correlation peaks.

In practice, when the phase difference between the output of the digital matched filter and the sampled pseudo noise signal input to the digital matched filter is detected, a difference less than one cycle of a system clock is rarely needed. Thus, the phase difference can be calculated on a unit time basis corresponding to the one clock cycle. Thus, the phase difference can be represented by an integer.

In one embodiment of the present invention, the approximate function is represented by a quadratic polynominal. This allows the peak detecting circuit to be a simple, compact hardware structure which results in a high-speed operation and a good transmission characteristic.

When a digital matched filter is used to construct a communication system, detection of the correlation peak value itself is not required in many cases. In such a case, presence of the correlation peak or the plus or minus sign of the correlation peak value can be determined by a simple calculation using parameters of the approximate function without calculating the correlation peak value itself. This eliminates erroneous detection of the correlation peak due to influence of fluctuation in an offset of the correlation output or sample timing In the present invention, the correlation peak is detected according to the parameters of the approximate function by using a threshold value. The threshold value may be set based on previously obtained parameters of the quadratic function. Accordingly, the threshold value can be adaptively set with respect to fluctuation in the correlation peak due to fluctuation in a transmission path characteristic and the like.

In one embodiment of the present invention, a differential signal may be input to the digital filter so that a dynamic range of the signal input to the digital matched filter is decreased. When such a differential signal is input to the digital matched filter, a pulse-like signal does not appear in the signal input to the digital matched filter. Thereby, a number of bits used by calculations in the digital matched filter is reduced. This reduces a size and power consumption of the digital matched filter. Additionally, operation logic can be simplified which results in an increase in an operation speed.

Additionally, by using the differential signal, an offset of the signal input to the digital matched filter can be cancelled.

When the digital matched filter is used, there may be a case in which information with respect to a sign of the correlation peak value is required. According to the present invention, a sign of the correlation peak value can be determined based on a curvature of the approximate function. The curvature can be represented by a result of a simple calculation using parameters of the approximate function. The result of determination of the sign of the correlation peak value may be used for demodulation of data output from the digital matched filter.

If the digital matched filter is used in a code division multiple access system (CDMA), the output of the digital matched filter is influenced by a cross-correlation between other communication channels. This may cause an erroneous detection of a correlation peak. The present invention eliminates such an erroneous detection by using a curvature of the approximate function as a condition for determining presence of the correlation peak.

Additionally, there is provided according to another aspect of the present invention a peak detecting method for detecting a peak of a waveform of a time discrete signal, the peak detecting method comprising the steps of:

calculating an approximate function which approximates the waveform of the time discrete signal; and calculating a peak time when the peak of the waveform of said time discrete signal appears.

According to the above-mentioned invention, the time discrete signal having a sharp peak is represented by the approximate function. The peak of the time discrete signal is detected as an extremum of the approximate function. Sine the approximate function can be represented by a quadratic polynominal, a peak value or a time when the peak value appears can be estimated by a simple calculation based on coefficients of the quadratic polynominal. Thus, the peak detecting method according to the present invention can be achieved by a simple circuit structure.

The peak detecting method according to the present invention may further comprise the steps of:

inputting a signal obtained by sampling a pseudo noise signal transmitted via a communication medium to a digital matched filter; and obtaining the time discrete signal from the digital matched filter.

Additionally, the peak detecting method according to the present invention may further comprise the steps of:

calculating parameters of the approximate function;

calculating an extremum of the approximate function; and determining the calculated extremum to be a peak value of the time discrete signal.

Other objects, features and advantages of the present invention will become more apparent from the following detailed description when read in conjunction with the accompanying drawings.

DETAILED DESCRIPTION OF THE PREFERRED EMBODIMENTS

First, a description will be given, with reference to FIG. 7, of a code division multiple access (CDMA) communication system provided with a correlation peak detecting circuit according to the present invention.

Figure 7:
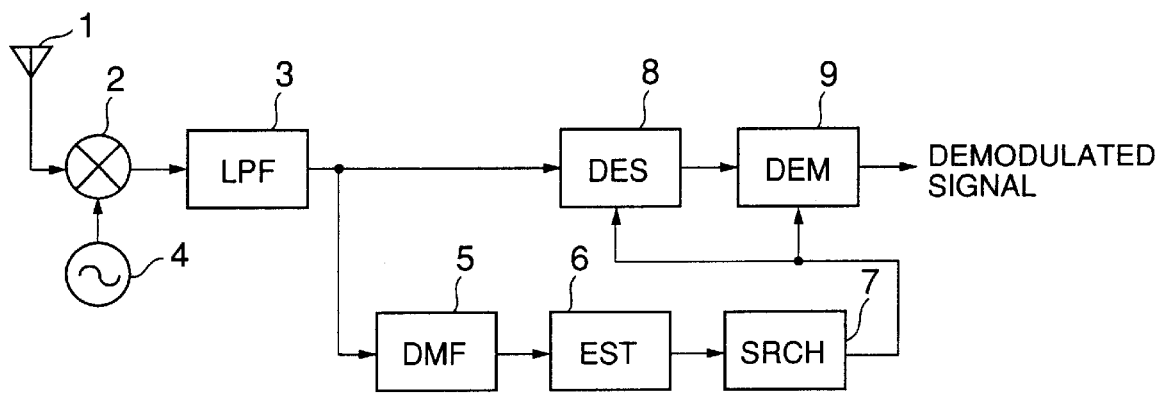
FIG. 7 is a block diagram of a code division multiple access communication system provided with a correlation peak detecting circuit according to the present invention.

In FIG. 7, the CDMA communication system comprises an antenna 1, a mixer 2, a low-pass filter 3, a local oscillating circuit 4, a digital matched filter 5, a correlation peak detecting circuit according to the present invention, a path estimating circuit 7, a despreading circuit 8 and a demodulating circuit 9. In the CDMA communication system, a signal is received by the antenna 1. In the mixer 2, the received signal is multiplied by an oscillation signal generated by the local oscillating circuit 4. The received signal is changed to a base band signal by being passed through the low-pass filter 3. The reception signal changed to the low band signal is input to the digital matched filter 5 and the despreading circuit 8. The digital matched filter 5 calculates correlation values of the received signal and a spreading signal. Then, the correlation peak detecting circuit detects a peak of the correlation values so as to obtain a reception timing of the spreading signal. The reception timing is determined by selecting a correlation peak having a probability from among some candidates of the correlation peak by the path estimating circuit. The candidates of the correlation peak are output from the correlation peak detecting circuit 6. The despreading circuit 8 generates a despreading signal (replica signal) in synchronization with the reception timing. The reception signal is multiplied by the despreading signal so as to despread the reception signal. When the period of the spreading signal matches the timing of the data signal, the reception timing is input to the demodulating circuit so as to perform a demodulation process in synchronization with the reception timing. As mentioned above, it is important for the CDMA communication system to detect the correlation peak. The detection of the correlation peak can be easily achieved by using the correlation peak detecting circuit according to the present invention.

First Embodiment

Figure 8:
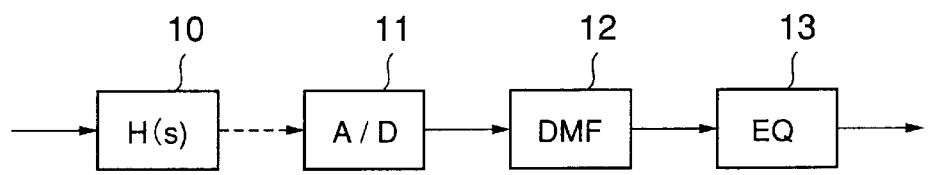
FIG. 8 is a block diagram of a part of a communication system including a correlation peak detecting circuit according to a first embodiment of the present invention.

FIG. 8 is a block diagram of a circuit including a correlation peak detecting circuit according to a first embodiment of the present invention.

In FIG. 8, a functional block 10 has a certain transmission characteristic. The functional block 10 represents a band pass filter for a bandwidth restriction of a transmitter system and a transmission path characteristic of a receiver system. An A/D converter 11 converts a received analog signal into a time discrete signal (digital signal). The time discrete signal is input to a digital matched filter 12. An output of the digital matched filter 12 is input to a correlation peak detecting circuit 13 according to the first embodiment of the present invention. The correlation peak detecting circuit 13 is able to calculate parameters of a function which approximates a function represented by the output of the digital matched filter 5.

A description will now be given of an operation of the correlation peak detecting circuit shown in FIG. 8.

Figure 1:
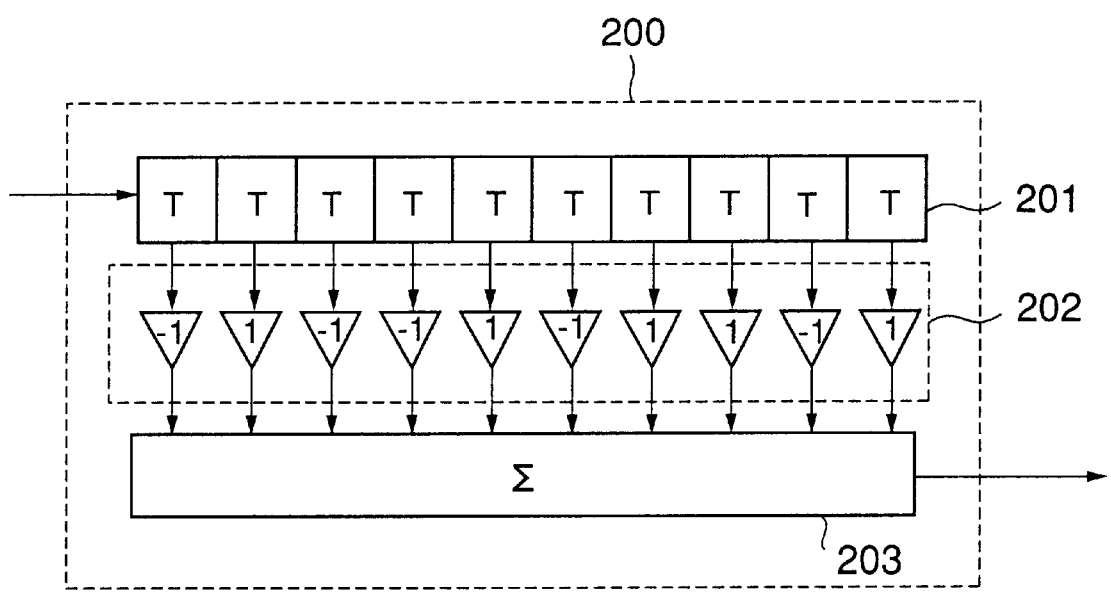
FIG. 1 is a block diagram of a digital matched filter used in a conventional spread spectrum circuit.
Figure 2A:
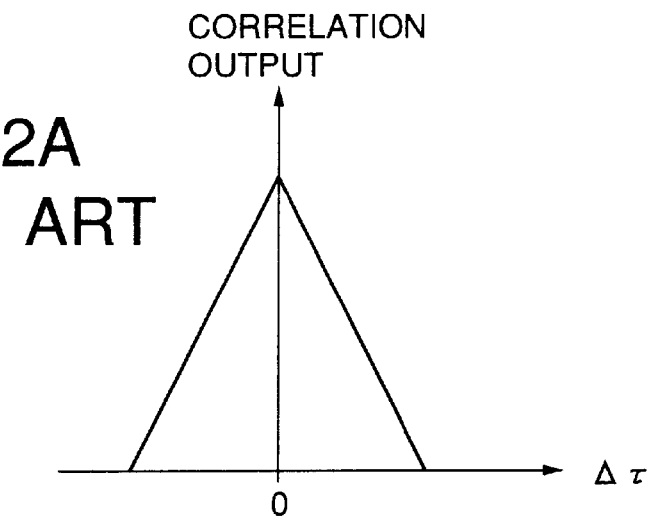
FIGS. 2A, 2B and 2C are examples of correlation characteristics represented by a correlation output with respect to a phase shift Δτ from a reference phase.
Figure 2B:
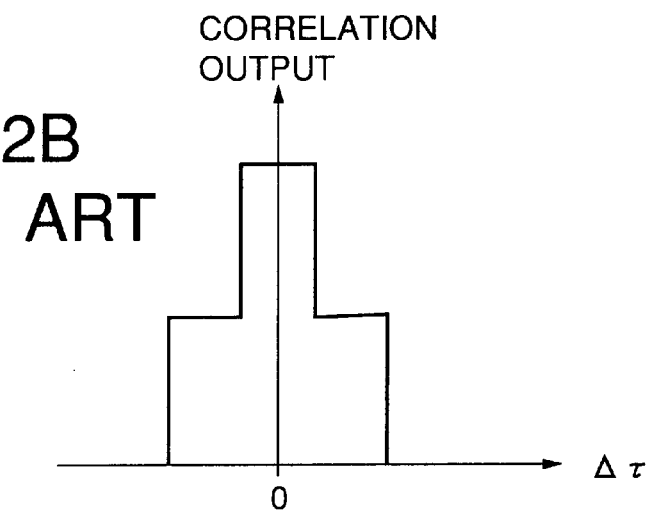
Figure 2C:
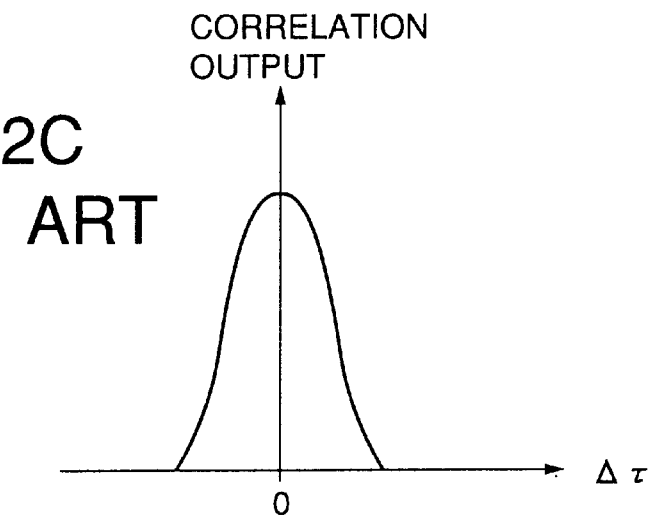
Figure 4A:
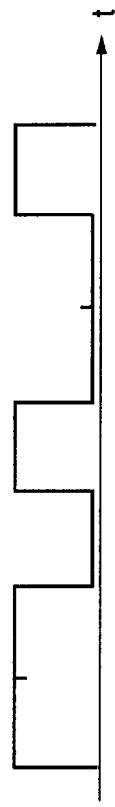
FIG. 4A is an example of a PN signal transmitted by a sender.
Figure 4B:
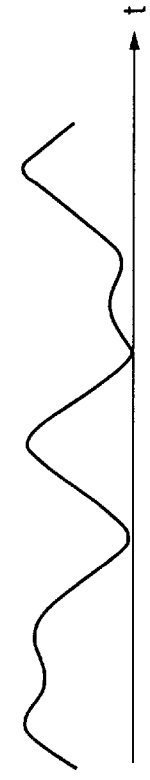
FIG. 4B is a correlation characteristic when the PN signal shown in FIG. 4A is input to a digital matched filter.
Figure 4C:
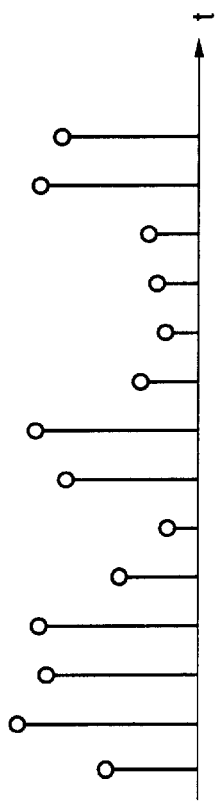
FIG. 4C is an example of output of the digital matched filter represented by discrete signals.
Figure 4D:
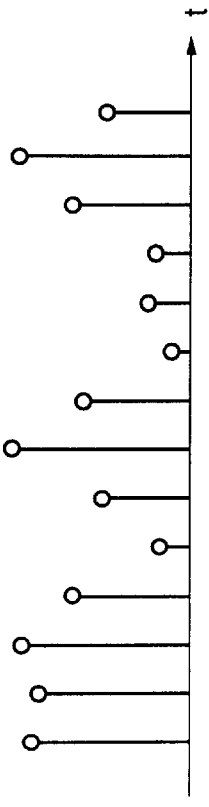
FIG. 4D is another example of output of the digital matched filter represented by discrete signals.
Figure 5A:
FIG. 5A is an example of an original correlation peak.
Figure 5B:
FIG. 5B is an example of a dulled correlation peak.
Figure 5C:
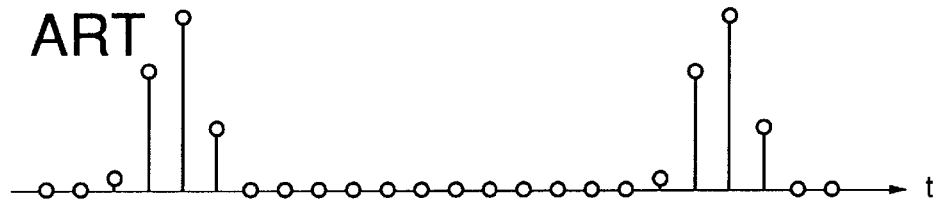
FIG. 5C is an example of a discrete signal representing the correlation peak shown in FIG. 5B.
Figure 5D:
FIG. 5D is another example of the discrete signal representing the correlation peak shown in FIG. 5B.
Figure 6:
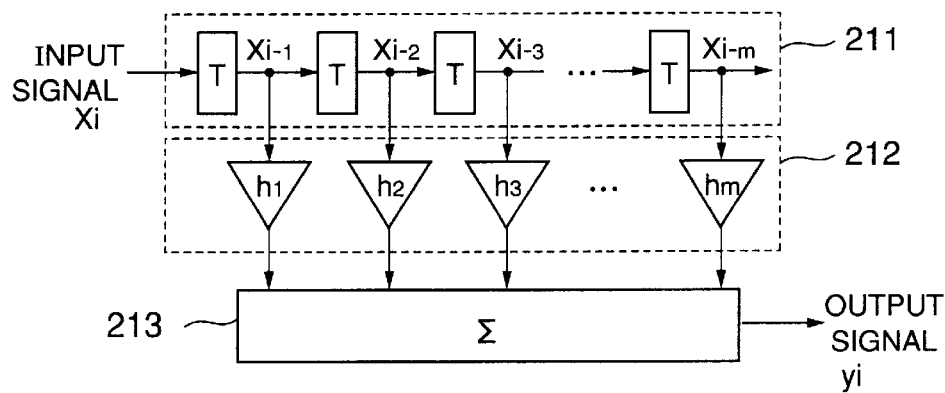
FIG. 6 is a block diagram of a structure of a conventional digital matched filter.

The PN signal (FIG. 4A) generated by a transmitter is changed to the signal shown in FIG. 4B since a high-frequency component of the PN signal is cut off due to a bandwidth restriction in the transmitter and a demodulation characteristic of a receiver. This signal is input to the A/D converter 11 and is changed to a discrete signal with respect to time. The discrete signal output from the A/D converter 11 is as shown in FIG. 2C. The discrete signal is then input to the digital matched filter 12.

Figure 3A:
FIGS. 3A to 3E are examples of outputs of a matched filter when a discrete PN signal is input to the matched filter.
Figure 3B:
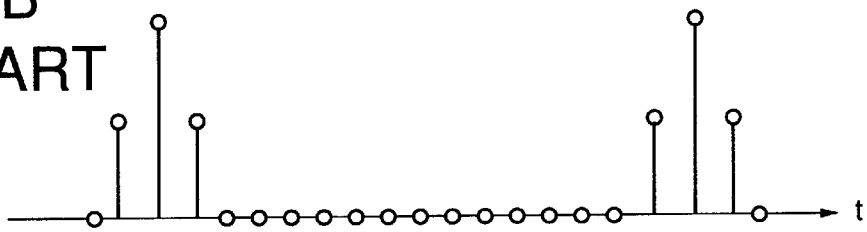
Figure 3C:
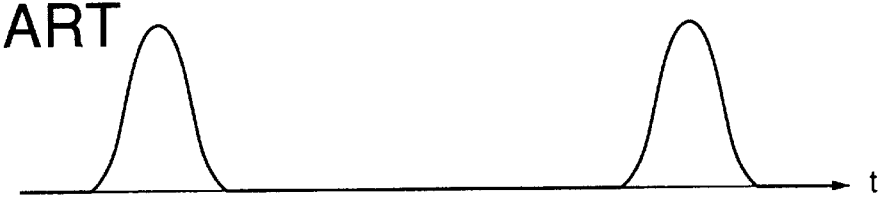
Figure 3D:
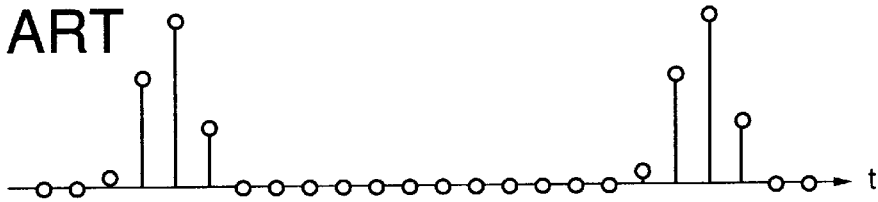
Figure 3E:
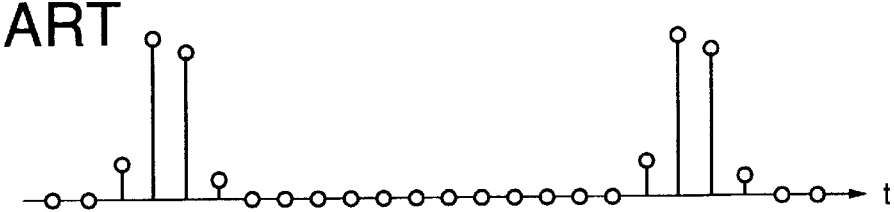

The digital matched filter 12 operates in synchronization with a sampling clock of the A/D converter 11. Accordingly, the digital matched filter 12 outputs a signal for each cycle of the sampling clock. Thus, when the above-mentioned processed PN signal is input to the digital matched filter 12, the digital matched filter 12 outputs a discrete signal having an envelope corresponding to the above-mentioned autocorrelation characteristic as shown in FIG. 3D or FIG. 3E. The signal output from the digital matched filter 12 is input to the correlation peak detecting circuit 13 shown in FIG. 8.

The correlation peak detecting circuit 13 uses a function which approximates the correlation characteristic shown in FIG. 2C. The function used by the correlation peak detecting circuit 13 may be a function having a convex or concave curve, that is, a function which is not monotonously increasing or decreasing. The correlation output at or near a peak is approximated by such an approximate function. As for such an approximate function, an n-th degree polynominal, a Gaussian function or a cosine function may be used.

n-th degree polynominal $$f(t)=a_n t^n+a_{n-1}t^{n-1}+ \ldots +a_1 t+n \qquad (1)$$

Gaussian function $$f(t)=Ae^{-k(t-c)^2} \qquad (2)$$

Cosine function $$f(t)=A \cos bt \qquad (3)$$

The correlation peak detecting circuit 13 estimates the parameters of those functions. That is, when the n-th degree polynominal equation is used, the parameters $a_n, a_{n-1}, \ldots, a_0$ are estimated. When the Gaussian function is used, the parameters A, k and c are estimated. When the cosine function is used, the parameters A and b are estimated.

Figure 9:
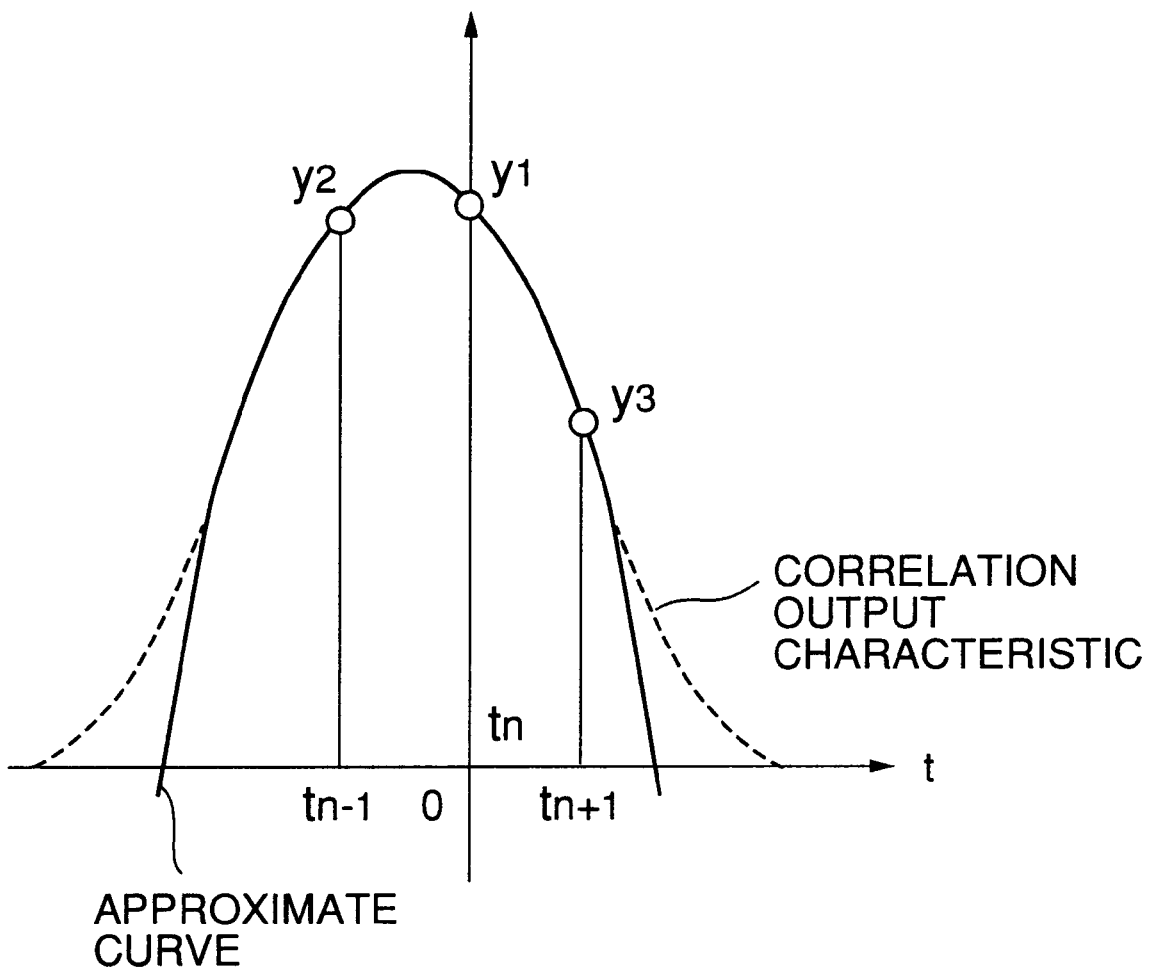
FIG. 9 is a graph for explaining an approximate curve with respect to a correlation peak.

A value of each of these parameters can be determined by establishing simultaneous equations according to the output signal $y_k$ of the digital matched filter 12 which is input to the correlation peak detecting circuit at a certain time $t_k$. For example, in the case shown in FIG. 9, the following simultaneous equations can be established.

$$y_1=f(t_n) \qquad (4)$$

$$y_2=f(t_{n-1}) \qquad (5)$$

$$y_3=f(t_{n-1}) \qquad (6)$$

The above-mentioned simultaneous equations are solved with respect to the parameters.

As mentioned above, the approximate curve of the correlation peak is determined according to the input signal. Thus, the correlation peak can be determined by obtaining an extremum of the approximate curve. For example, a time $t_{max}$ when the correlation peak takes an inflection value can be obtained by solving the differential equation of the approximate curve with respect to 0. Additionally, the inflection value $y_{max}$ can be obtained by inputting the time $t_{max}$ to the approximate equation. Accordingly, the correlation peak detecting circuit 13 has a function to calculate the above-mentioned parameters and a function to obtaining the inflection value $y_{max}$.

Second Embodiment

The time $t_{max}$ when the approximate equation takes the inflection value $y_{max}$ represents a phase difference between the PN signal and the sampling clock. Accordingly, a phase correction of the sampling clock can be performed according to the time $t_{max}$. Additionally, a time of appearance of a next correlation pulse can be estimated based on the time $t_{max}$.

Figure 10:
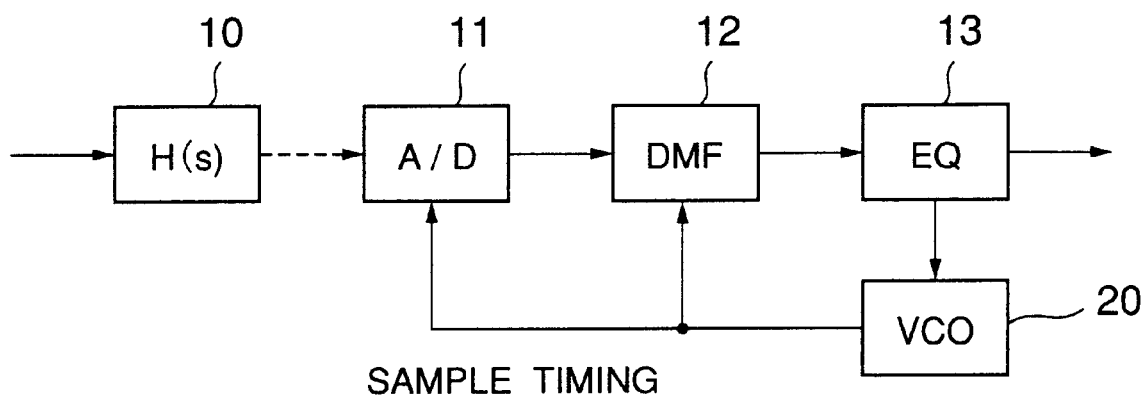
FIG. 10 is a block diagram of a part of a communication system including a correlation peak detecting circuit according to a second embodiment of the present invention.

FIG. 10 is a block diagram of a circuit including a correlation peak detecting circuit according to a second embodiment of the present invention. In the correlation peak detecting circuit shown in FIG. 10, a phase correction of the sampling clock is performed based on the time $t_{max}$. In FIG. 10, parts that are the same as the parts shown in FIG. 8 are given the same reference numerals. In FIG. 10, a voltage controlled oscillator (VCO) 20 is provided for generating and supplying a sampling clock to the A/D converter 11 and the digital matched filter 12.

As mentioned above, the time $t_{max}$ when the correlation peak takes an inflection value can be obtained by solving the differential equation of the approximate curve with respect to 0. That is, the time $t_{max}$ can be obtained by the following equation.

$$df(t_{max})/dt=0 \qquad (7)$$

The phase difference between the sampling clock and the input signal can be detected according to the obtained time $t_{max}$ even though the input signal is input every cycle of the sampling clock and the phase difference is within a cycle time of the sampling clock. Accordingly, a value near the correlation peak can be obtained by performing the phase correction of the sampling clock. Thus, the phase of the sampling clock and the phase of the correlation peak can be matched by controlling an oscillating frequency of the voltage controlled oscillator 20.

The approximate function used in this embodiment approximates a part of the curve in the vicinity of the correlation peak. Thereby, when the parameters are estimated based on a time $t_n$ which is far away from the correlation peak, a phase error is generated. However, a value close to the correlation peak can be obtained by performing the phase correction of the sampling signal, and, thereby, the accuracy of the approximate curve is improved and the transmission characteristic is also improved.

A time window detecting method is popular as a method for improving the transmission characteristic. In the time window detecting method, a time when a next correlation pulse appears is estimated previously based on a correlation pulse output obtained from the digital matched filter. This method uses the fact that the correlation peak is output from the digital matched filter 12 for each cycle of the PN signal input thereto. That is, in this method, the time when a next correlation peak appears is predicted according to a time obtained by (a time when the correlation peak appears)+(a period of one cycle) so as to detect the correlation peak only for a short period (referred to as a time window) including the predicted time. At this time, if the time when the correlation peak appears is accurately detected, the time window in the time window detecting method can be shortened, resulting in an improvement of the transmission characteristic.

Third Embodiment

Figure 11:
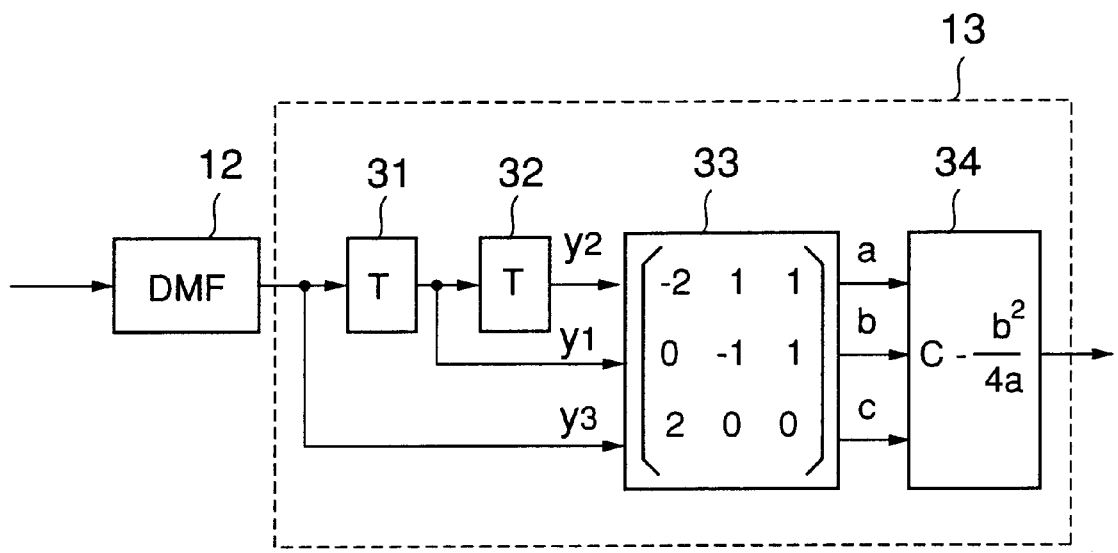
FIG. 11 is a block diagram of a correlation peak detecting circuit according to a third embodiment of the present invention.

In the present embodiment, a simple structure of a correlation peak detecting circuit is achieved by using two polynominals for the approximate function. FIG. 11 is a block diagram of a correlation peak detecting circuit according to a third embodiment of the present invention. In FIG. 11, parts that are the same as the parts shown in FIG. 8 are given the same reference numerals. In FIG. 11, a part surrounded by dashed lines corresponds to the correlation peak detecting circuit 13 shown in FIG. 8. In this embodiment, the correlation peak detecting circuit 13 comprises delay circuits 31 and 32, a linear conversion circuit 33 and a peak calculating circuit 34.

The correlation peak detecting circuit 13 of this embodiment operates as follows.

When an approximation is performed based on a quadratic polynominal, a function f(t) is given as the following equation.

$$F(t)=at^2+bt+c \qquad (8)$$

On the assumption that three input signals are output from the digital matched filter are $(t_n, y_1)$, $(t_{n-1}, y_2)$ and $(t_{n+1}, y_3)$, the parameters a, b and c of the quadratic equation (8) must satisfy the following three relationships.

$$y_1=at_n^2+bt_n+c \qquad (9)$$

$$y_2=at_{n-1}^2+bt_{n-1}+c \qquad (10)$$

$$y_1=at_{n+1}^2+bt_{n+1}+c \qquad (11)$$

Since a time axis can be arbitrarily set, it is assumed that $t_n=0$. Additionally, on the assumption that $t_{n-1}$ is an input signal immediately preceding $t_n$, $t_{n+1}$ is an input signal immediately proceeding $t_n$ and a duration of a signal clock is 1, the relationships (9), (10) and (11) can be represented as follows.

$$y_1=c \qquad (12)$$

$$y_2=a(-1)^2+b(-1)+c \qquad (13)$$

$$y_3=a(+1)^2+b(+1)+c \qquad (14)$$

Accordingly, three simultaneous equations are established.

Thee above-mentioned three simultaneous equations can be solved with respect to the parameters a, b and c as follows.

$$\begin{bmatrix} a \\ b \\ c \end{bmatrix} = \frac{1}{2} \begin{bmatrix} -2 & 1 & 1 \\ 0 & -1 & 1 \\ 2 & 0 & 0 \end{bmatrix} \begin{bmatrix} y_1 \\ y_2 \\ y_3 \end{bmatrix} \qquad (15)$$

Since 1/2 is a constant, this can be ignored. Accordingly, the parameters a, b and c can be obtained by performing operations including a multiplication by 2, an addition and a subtraction.

In a digital circuit, a multiplication by 2 can be achieved by shifting a single bit. Accordingly, the parameters a, b and c can be obtained by a shifting operation and an adding and subtracting circuit which are achieved by a simple construction.

In the correlation peak detecting circuit 13 shown in FIG. 11, $y_1$, $y_2$ and $y_3$ are produced by the one-clock delay circuits 31 and 32 so as to obtain the parameters a, b and c of the quadratic equation by performing the above-mentioned operations by the linear conversion circuit 33.

Additionally, the inflection value can be obtained as follows.

The above-mentioned equation (8) is rearranged as follows.

$$F(t)=a(t+b/2a)^2-b^2/4a+c \qquad (16)$$

By substituting the parameters a and b for (a time of an extremum–b/2a), the time when the correlation peak appears is known. Additionally, the correlation peak value can be obtained by substituting the parameters a, b and c for the inflection value $(c-b^2/4a)$.

Specifically, the inflection value $(c-b^2/4a)$ is calculated by the peak calculating circuit 34 shown in FIG. 11, and the result is output from the correlation peak detecting circuit 13.

Fourth Embodiment

A phase difference between the input signal and the sampling clock can be known according to the (a time of an extremum–b/2a). Since $t_n$ is set to zero, –b/2a represents a period from the time $t_n$.

Figure 12:
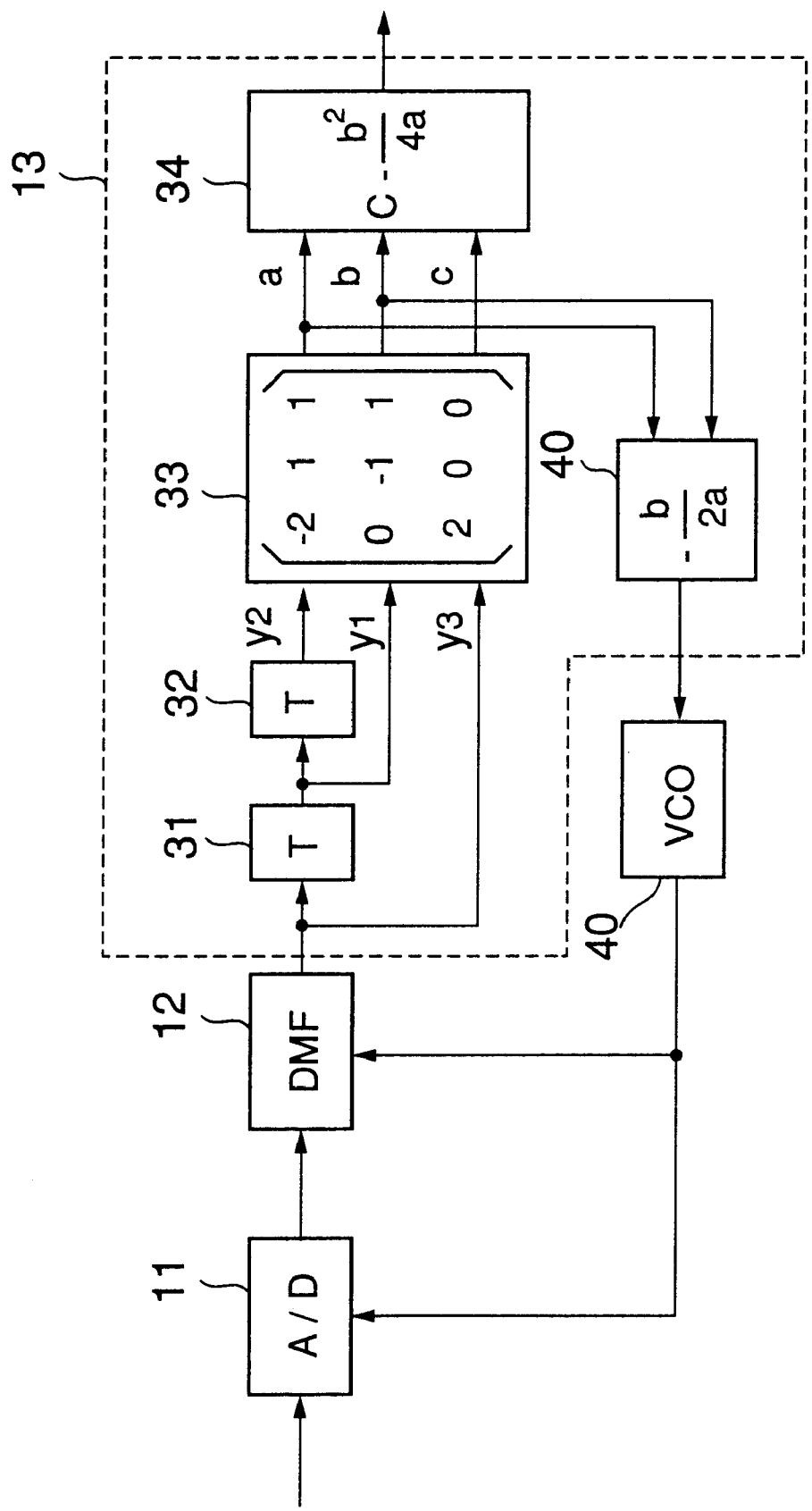
FIG. 12 is a block diagram of a correlation peak detecting circuit according to a fourth embodiment of the present invention.

FIG. 12 is a block diagram of a correlation peak detecting circuit according to a fourth embodiment of the present invention. In FIG. 12, parts that are the same as the parts shown in FIG. 11 are given the same reference numerals. In the correlation peak detecting circuit 13 shown in FIG. 12, a time at which the inflection value appears is used for controlling a phase of the sampling clock. As shown in FIG. 12, the correlation peak detecting circuit 13 is provided with a calculating circuit 40 which calculates a correlation peak time, that is, the above-mentioned value (–b/2a).

When $t_n=0$, the correlation peak time is determined as (–b/2a) by the parameters a and b. Accordingly, a phase correction can be performed by feeding back the value (–b/2a) to a voltage controlled oscillator 20 which drives the A/D converter 11 and the digital matched filter 12 as a control signal.

Fifth Embodiment

In many cases, a correction of the phase difference between the PN signal and the sampling clock can be achieved by shifting a single clock cycle of a system clock. In such a case, the circuit can be further simplified.

Figure 13:
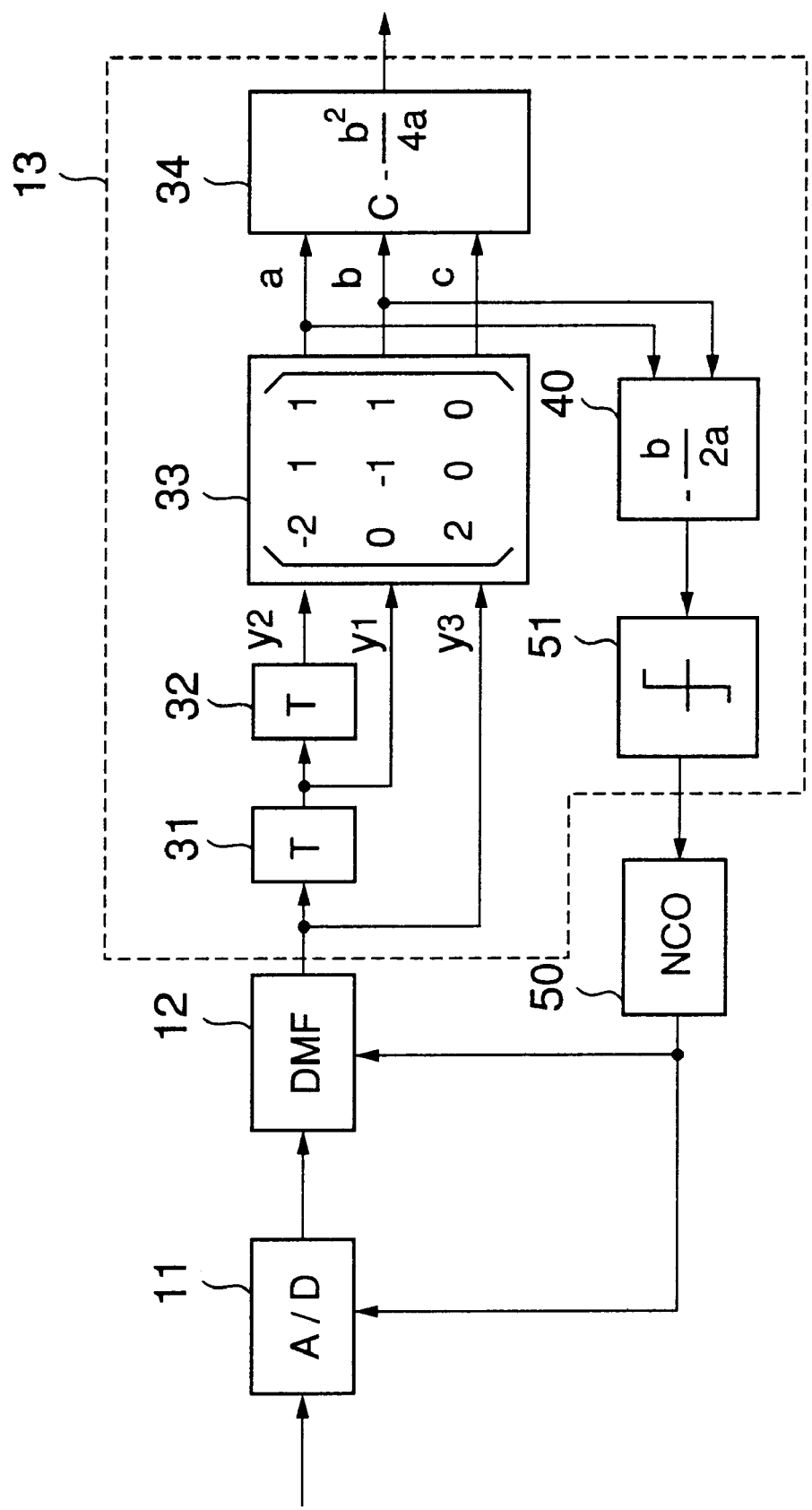
FIG. 13 is a block diagram of a correlation peak detecting circuit according to a fifth embodiment of the present invention.

FIG. 13 is a block diagram of a correlation peak detecting circuit according to a fifth embodiment of the present invention. In FIG. 13, parts that are the same as the parts shown in FIG. 12 are given the same reference numerals.

The correlation peak detecting circuit shown in FIG. 13 is used with a numerically controlled oscillator 50. A threshold value circuit 51 is provided in the correlation peak detecting device so as to obtain an integer part of the detected phase difference.

In the calculating circuit 40 for calculating the correlation peak time, the parameter b is divided by 2a. Thus, a result of the calculation includes a decimal. Accordingly, a phase correction can be achieved by feeding back an integer part of the result of calculation to the numerically controlled oscillator 50.

In this embodiment, the detection of a phase difference is achieved by the calculating circuit 40 and the threshold circuit 40. However, these circuits may be combined together and may be further simplified. In this embodiment, the threshold circuit 40 outputs an integer part when a phase difference corresponding to more than one clock cycle is detected. That is, the threshold circuit 40 outputs an integer part when the following relationship is established.

$$|-b/2a|>1 \qquad (17)$$

The above-mentioned relationship can be rearranged as follows.

$$|b|>|2a| \qquad (18)$$

Accordingly, it can be determined that a phase difference corresponding to more than one clock cycle is present when the relationship (18) is satisfied. The sign of the output value of the threshold circuit 40 can be determined by referring to signs of the parameters a and b. That is, the output value is minus if both the parameters a and b are minus. If a sign of one of the parameters a and b is different from the other, the output value is plus.

Sixth Embodiment

In a practical communication system, a detection of the correlation peak value itself is rarely required. In many cases, a determination of a presence of a correlation peak or a sign of the correlation peak is sufficient. In such a case, the structure according to the present invention can be further simplified and can be a strong system against a fluctuation in various conditions.

Figure 14:
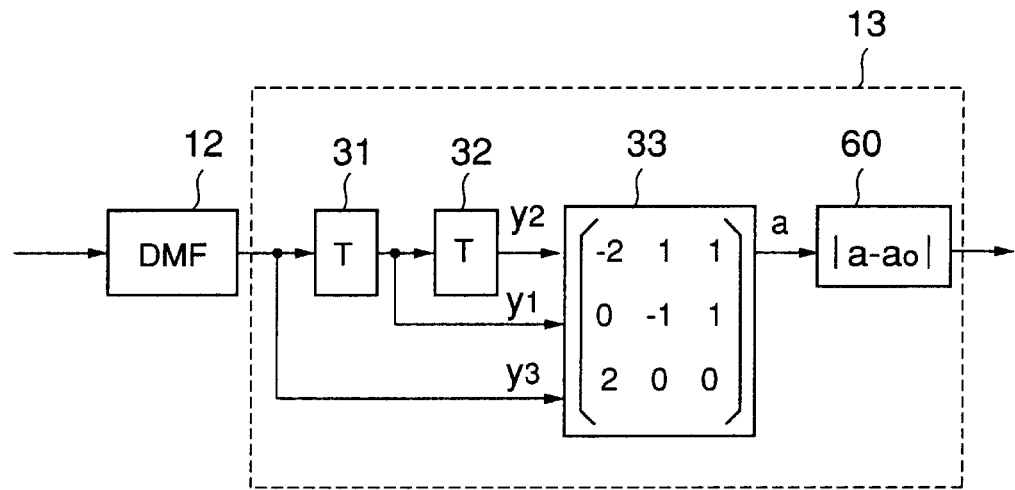
FIG. 14 is a block diagram of a correlation peak detecting circuit according to a sixth embodiment of the present invention.

FIG. 14 is a block diagram of a correlation peak detecting circuit according to a sixth embodiment of the present invention. In FIG. 14, parts that are the same as the parts shown in FIG. 11 are given the same reference numerals. The correlation peak detecting apparatus shown in FIG. 14 is provided with a circuit 60 which calculates a distance between the parameter a and a reference value a0.

Presence of the correlation peak or a sign of the correlation peak value can be determined by values of the parameters without calculating the correlation peak value itself. Presence of the correlation peak can be determined by measuring a distance between an estimated value of the parameter when the correlation peak is present and a parameter value obtained by calculation. If the measured distance falls within a predetermined range, it can be determined that the correlation peak is present. A sign of the correlation peak value can be determined in the same manner.

When the correlation peak is approximated by a quadratic function, presence of the correlation peak may be determined by comparing the parameters a, b and c with reference values a0, b0 and c0. For example, the following equation may be calculated where g(a, b, c) is an evaluation function.

$$G(a,\ b,\ c)=(a-a0)^2+(b-b0)+(c-c0) \qquad (19)$$

However, in such a case, there are problems in that a circuit structure is complicated and the system is weak against signal fluctuations. For example, the parameter values are influenced by fluctuation in an offset of the input signal and fluctuation in a sampling time. Accordingly, it is required to select parameters having less fluctuation or establish an evaluation function which reduces a degree of fluctuation. FIG. 14 shows such an example in which a parameter having less fluctuation.

In the above-mentioned equation (8), fluctuation of an offset appears in the parameter c and fluctuation of the sampling time appears in the parameter b as is appreciated from the equation (16). Accordingly, the parameter a is most appropriate for use. The parameter a determines a radius of curvature of the quadratic equation. The parameter a takes a value nearly equal to zero when the correlation peak is not present. Additionally, the parameter a takes a minus value when there is a correlation peak having a plus value, and takes a plus value when there is a correlation peak having a minus value.

As mentioned above, presence of the correlation peak or a sign of the correlation peak value can be determined by measuring the distance between the reference value a0 and the calculated value of the parameter a. In this case, the evaluation function g(a) can be represented as follows.

$$g(a)=|a-a0| \qquad (20)$$

In this case, since only an absolute value of a difference between the reference value a0 and the value of the parameter is to be obtained, such an operation can be achieved by a simple circuit.

Seventh Embodiment

The parameter a varies when a transmission characteristic of a transmission path fluctuates. In order to eliminate an influence of the fluctuation in the transmission characteristic, the estimated value of the parameter a may be adaptively changed so as to improve the transmission characteristic.

Figure 15:
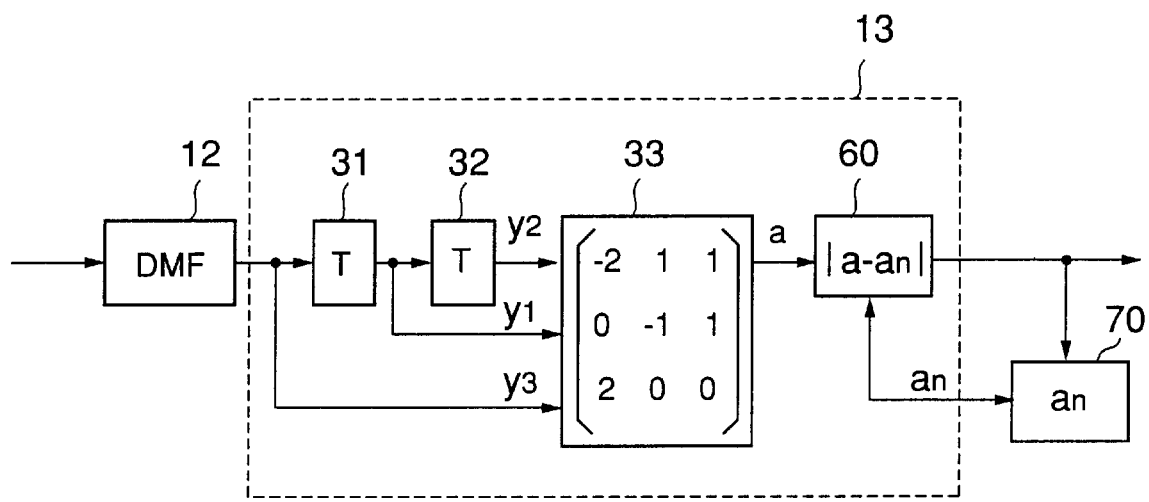
FIG. 15 is a block diagram of a correlation peak detecting circuit according to a seventh embodiment of the present invention.

FIG. 15 is a block diagram of a correlation peak detecting circuit according to a seventh embodiment of the present invention. In FIG. 15, parts that are the same as the parts shown in FIG. 14 are given the same reference numerals.

The correlation peak detecting circuit shown in FIG. 15 is provided with a circuit for calculating the estimated value of the parameter a.

Since the parameter a of the quadratic equation represents a radius of curvature of the correlation peak, the parameter a does not show a sharp change even if fluctuation occurs in the transmission path but a gentle fluctuation appears in the parameter a. Accordingly, it can be assumed that a present value of the parameter a is close to a previous value a of the parameter a. Accordingly, by comparing the two values, presence of the correlation peak can be accurately determined and an estimated parameter value can be output based on a result of the comparison. This achieves improvement in the transmission characteristic.

The circuit 70 for estimating a value of the parameter a may be a circuit which outputs the value of parameter a which is obtained at a previous time or a circuit which outputs an average value of a medium value of some previously obtained values.

Eighth Embodiment

Figure 16:
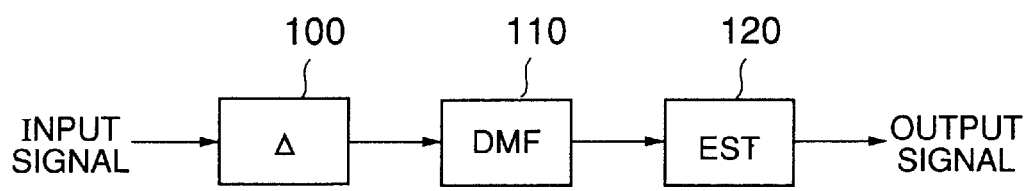
FIG. 16 is a block diagram of a part of a communication system including a correlation peak detecting circuit according to an eighth embodiment of the present invention.

FIG. 16 is a block diagram of a part of a communication system including a correlation peak detecting circuit according to an eighth embodiment of the present invention. In FIG. 16, an input signal is input to a differential circuit 100 which calculates a difference between a present input signal and an. immediately preceding input signal. The differential signal calculated by the differential circuit 100 is supplied to a digital matched filter 110. An output of the digital matched filter 110 is supplied to an estimating circuit 120 for estimating an approximate function of an input signal so as to obtain a peak value of the approximate function.

The signal input to the differential circuit 100 is a time discrete signal xi which is obtained by an A/D converter. The differential circuit 100 calculates a difference between the signal Xi and an immediately preceding signal $x_{i-1}$. Thus, the difference signal $z_i$ is represented as $z_i=X_i-x_{i-1}$. When this signal is input to the digital matched filter 110, an output signal $w_i$ is calculated by the following equation.

$$w_i = \sum_{j=1}^{m} h_j z_{i+j} = \sum_{j=1}^{m} h_j(x_{i+j} - x_{i+j-1}) \qquad (23)$$
$$= \sum_{j=1}^{m} h_j x_{i+j} - \sum_{j=1}^{m} h_j x_{i+j-1}$$
$$= y_i - y_{i-1}$$

Since the digital matched filter is constituted by only linear operation elements, linearity is maintained in a relationship between an input and an output. Accordingly, when the differential signal $w_i$ is input as an input signal, an output of the digital matched filter can be obtained as a difference ($y_i-y_{i-1}$) between the original correlation values.

The differential signal $w_i$ is input to the circuit 120 which obtains a correlation peak value by estimating an approximate function. A description will now be given of a case in which coordinate values of three points are required for estimating the parameters of the approximate function.

In the above-mentioned first to seventh embodiments, the approximate function passing three points is obtained. The three points includes a point represented by a time $t_i$ at which the correlation value $y_i$ is output, a correlation value $y_{i-1}$ at an immediately preceding time $t_{i-1}$ and a correlation value $y_{i+1}$ at an immediately proceeding time $t_{i+1}$.

As mentioned above, an n-th degree polynominal, a Gaussian function or a cosine function may be used. The coordinate values of the three points ($t_{i-1}$, $y_{i-1}$), ($t_i$, $y_i$) and ($t_{i+1}$, $y_{i+1}$) are applied to one of the approximate function so as to establish three simultaneous equations. The parameters of the approximate function can be obtained by solving the simultaneous equations.

In the following embodiments, the following new approximate function y'(t) is used instead of the approximate function y(t).

$$y'(t)=y(t)-y_i \qquad (27)$$

The new approximate function is obtained by merely shifting the approximate function y(t) along the y axis. That is, a peak time of the new approximate function y'(t) is not changed. Additionally, since an original point of time can be set at any point, $T_{i-1}\equiv-1$ and $t_{i+1}\equiv1$ can be established by setting the original point to $t_i$ and setting a sampling interval as a unit time. Accordingly, the coordinate values of the above-mentioned three points are shifted to the following coordinate values.

$$(t_{i-1}, y_{i-1}-y_i)=(-1, -w_i)(t_i, y_i-y_i)=(0, 0)(t_{i+1}, y_{i+1}-y_i)=(1, w_{i+1}) \qquad (28)$$

Figure 17:
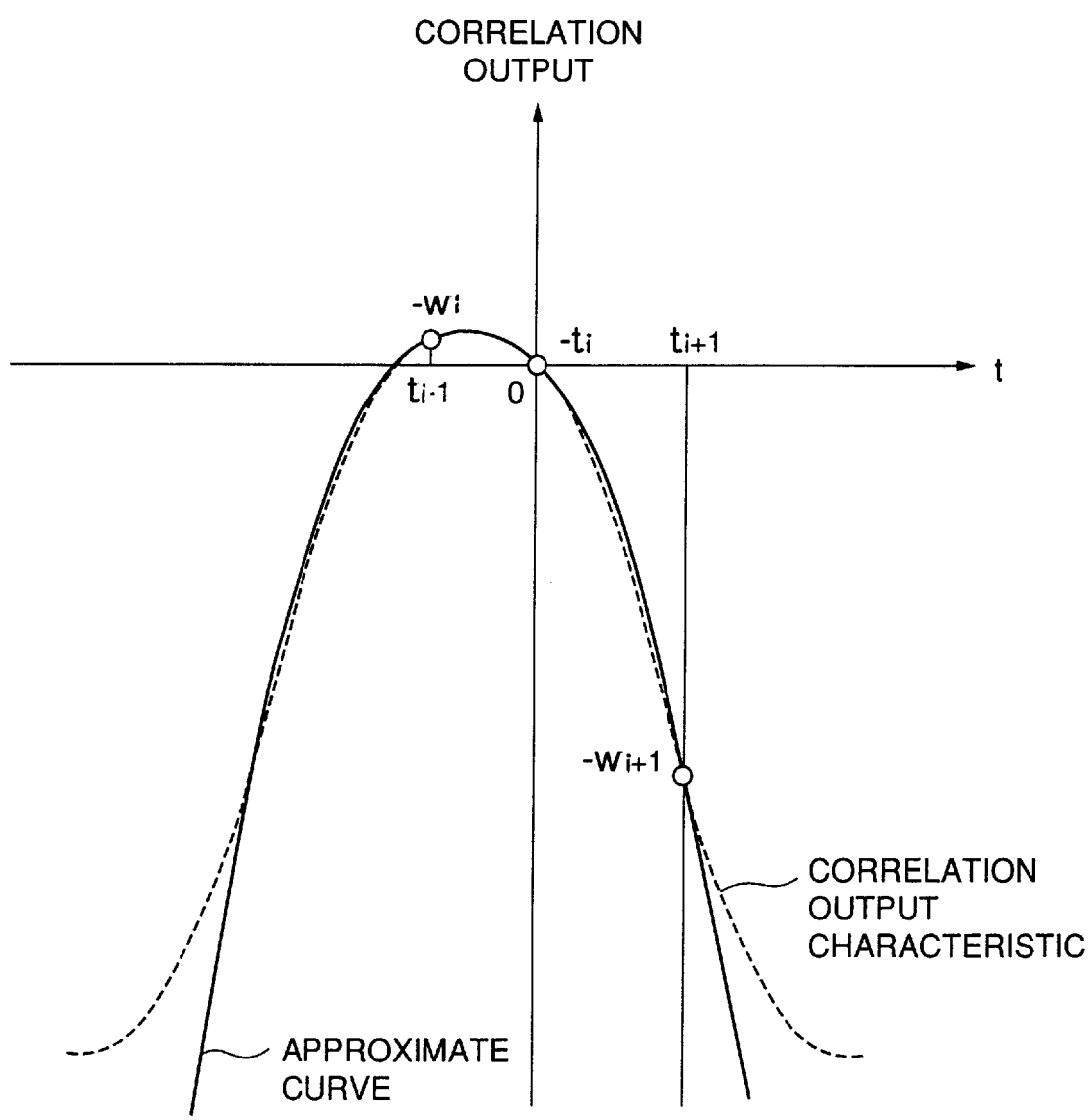
FIG. 17 is a graph showing a waveform of the correlation peak of which coordinate system is transformed.

FIG. 17 shows the above-mentioned relationship. That is, the approximate function y(t) is transformed to a coordinate system having an original point ($t_i$, $y_i$). According to this coordinate transformation, values needed to obtain the parameters of the approximate function y'(t) are only $w_i$ and $w_{i+1}$. As a result, the approximate function y'(t) can be determined according to only the differential signal of the input signal. The correlation peak time can be obtained by obtaining an inflection value of the approximate function y'(t). The inflection value is obtained by differentiating the approximate function so as to solve the following equation and substituting the obtained parameters for the resultant equation.

$$Dy(t)/dt=0 \quad (29)$$

The estimating circuit 120 detects the correlation peak value by performing the following two operations in accordance with the above-mentioned principle.

1. Estimating parameters of the approximate function based on the input signal $w_i$.
2. Substituting the parameters for the equation introduced by the equation (29) which is for detecting the correlation peak value.

It should be noted that an approximate function requiring more than four points for the establishment can be obtained. For example, if a value $y_{i+2}-y_i$ is used, this value can be obtained by a value $w_{i+2}-w_{i-1}$. As mentioned above, the present invention can be applied to the approximate function requiring more than four points.

Ninth Embodiment

Figure 18:
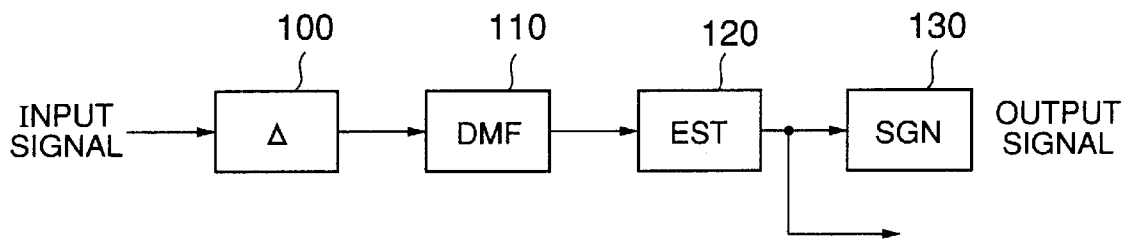
FIG. 18 is a block diagram of a part of a communication system including a correlation peak detecting circuit according to a ninth embodiment of the present invention.

FIG. 18 is a block diagram of a part of a communication system including a correlation peak detecting circuit according to a ninth embodiment of the present invention. In FIG. 18, parts that are the same as the parts shown in FIG. 16 are given the same reference numerals.

The correlation peak detecting circuit shown in FIG. 18 is provided with a determining circuit for determining a curvature of a waveform around a correlation peak. A second derivative is use for detecting a sign of the correlation peak. The curvature of the waveform around the correlation peak can be determined by substituting the correlation peak time and the parameters obtained by the above-mentioned eighth embodiment for the second derivative. If the obtained curvature is positive, the approximate function is convex downwardly in the vicinity of the correlation peak and it can be appreciated that the correlation peak value is a minus vale. On the contrary, if the obtained curvature is negative, the approximate function is convex upwardly in the vicinity of the correlation peak and it can be appreciated that the correlation peak value is a plus value.

Tenth Embodiment

Figure 19:
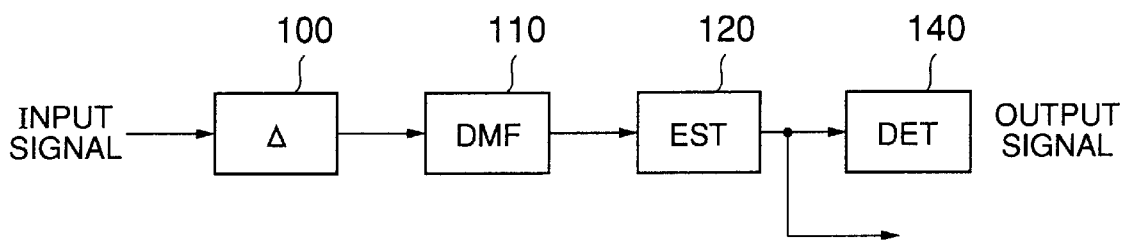
FIG. 19 is a block diagram of a part of a communication system including a correlation peak detecting circuit according to a tenth embodiment of the present invention.

FIG. 19 is a block diagram of a part of a communication system including a correlation peak detecting circuit according to a tenth embodiment of the present invention. In FIG. 19, parts that are the same as the parts shown in FIG. 16 are given the same reference numerals.

The correlation peak detecting circuit shown in FIG. 19 is provided with a circuit for determining a magnitude of a curvature in the vicinity of the of the correlation peak.

The correlation peak itself has a sharp pulse-like characteristic. Accordingly, when the digital matched filter outputs a correlation peak signal, a large change occurs in the correlation output as compared to other cases. Thus, a large change also occurs in a curvature of the approximate function itself in the vicinity of the correlation peak. Accordingly, the output of the correlation peak can be determined by obtaining a value of the second derivative of the approximate function at the correlation peak point.

Eleventh embodiment

When the present invention is achieved by hardware, a circuit can be greatly simplified by using a quadratic poly-nominal for the approximate function. The quadratic equation used for the approximate function is shown as follows.

$$y(t)=at^2+bt+c \quad (30)$$

This quadratic polynomial passes three coordinate points defined by the equation (28). Thus, the following multaneous equations are established.

$$-w_i = a(-1)^2 + b(-1) + c \quad (31)$$

$$0 = c$$

$$w_{i+1} = a(1)^2 + b(1) + c$$

By solving the above-mentioned simultaneous equations, the following equation is obtained.

$$a=1/2(w_{i+1}-w_i)b=1/2(w_{i+1}+w_i)c=0 \quad (32)$$

Accordingly, each parameter can be obtained by addition and subtraction.

Figure 20:
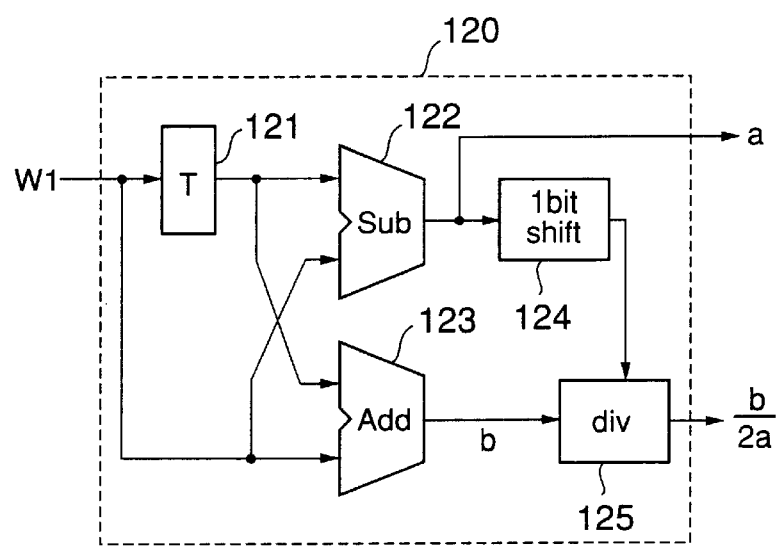
FIG. 20 is a circuit diagram of an estimating circuit according to an eleventh embodiment of the present invention.

FIG. 20 is a circuit diagram of the estimating circuit 120 shown in FIG. 19. In FIG. 20, the estimating circuit 120 is a part surrounded by dotted lines. The estimating circuit 120 comprises a delay element 121, a subtracting circuit 122, an adding circuit 123, a one-bit shifting circuit 124 and a dividing circuit 125. The one-bit shifting circuit 124 shifts a multi-bit signal by one bit-position toward the most significant bit (MSB).

The delay element 121 holds the signal $w_i$ for one output-timing so that the signal $w_i$ is output at the same time the next signal $w_{i+1}$ is output. The two signals $w_i$ and $w_{i+1}$ are input to both the subtracting circuit 122 and the adding circuit 123 at the same time. The subtracting circuit 122 calculates $(w_{i+1}-w_i)$, and a value of the parameter a is obtained. The adding circuit 123 calculates $(w_{i+1}+w_i)$, and a value of the parameter b is obtained. Since the inflection value of the quadratic equation can be obtained by calculating $(-b/2a)$, a value 2a is obtained by the one-bit shifting circuit 124 by shifting the bit value of the parameter by one bit. The calculated value of 2a is divided by the dividing circuit 125 so as to determine a time when the extremum appears.

Twelfth Embodiment

In order to detect a time (correlation peak time) when the correlation peak appears, it is sufficient in many cases to determine whether a time $t_i$ is closest to the peak of the approximate function. In such a case, the dividing circuit 125 of the above-mentioned eleventh embodiment can be omitted, and, thereby, the circuit structure is further simplified.

Figure 21:
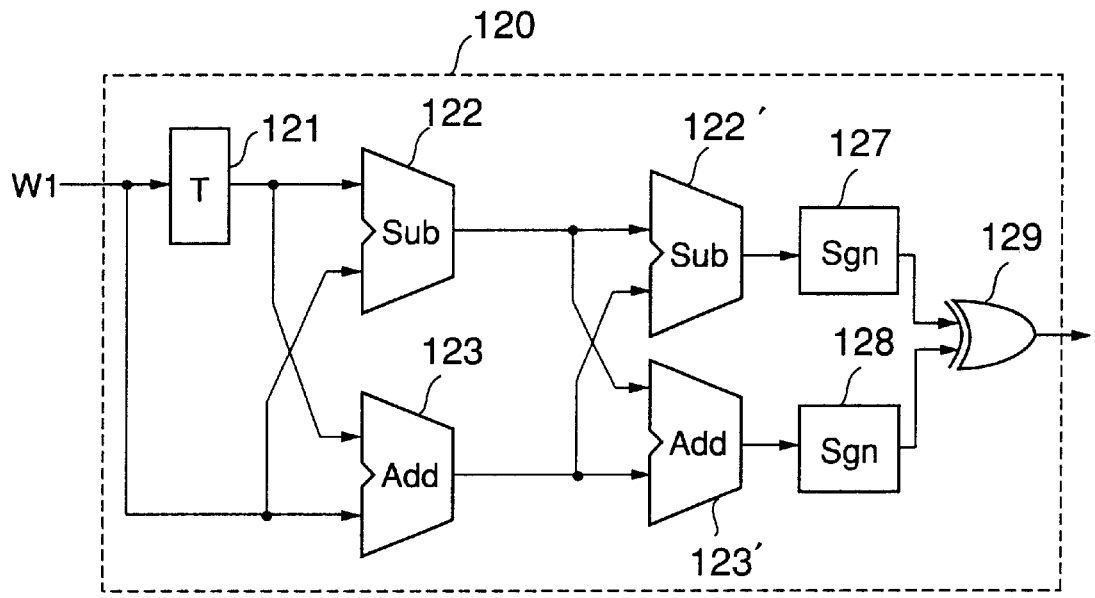
FIG. 21 is a circuit diagram of an estimating circuit according to a twelfth embodiment of the present invention.

FIG. 21 is a circuit diagram of an estimating circuit according to a twelfth embodiment of the present invention. In FIG. 21, parts that are the same as the parts shown in FIG. 20 are given the same reference numerals.

In the estimating circuit shown in FIG. 21, the output of the subtracting circuit 122 is input to a subtracting circuit 122' and an adding circuit 123'. The output of the adding circuit 123 is also input to both the subtracting circuit 122' and the adding circuit 123'. An output of the subtracting circuit 122' is input to a sign determining circuit 127. An output of the adding circuit 123' is input to a sign determining circuit 128. Outputs of the sign determining circuits 127 and 128 are input to an exclusive OR circuit 129.

In order to determine whether or not a time $t_i$ is closet to the correlation peak time, it is determined whether or not the time $t_i$ is within the ±½ range of timing from the correlation peak point. Since the time $t_i$ is set as the original point of the approximate function, it can be determined whether the time $t_i$ is within the ±½ range of the timing by determining whether the following relationship is satisfied.

$$-½ < -b/2a < ½ \qquad (33)$$

By solving the above-mentioned inequality, the following result is obtained.

$$(b-a)(a+b) < 0 \qquad (34)$$

(b−a) is calculated by the subtracting circuit 122' and (a+b) is calculated by the adding circuit 123'. Since only the sign of the result of the calculation is needed, the sign of each of the results of calculations is detected by the respective sign determining circuits 127 and 128 and results of the determinations are subjected to an exclusive OR operation by the exclusive OR circuit 129. Thus, the equation (34) is evaluated by one bit multiplication by the exclusive OR circuit so as to detect presence of the correlation peak.

In this embodiment, it is determined whether or not the correlation peak is present within the ±½ unit time range. However, if it is required to determined whether the correlation peak is present within a different unit time range such as a ±¼ unit time range, the value of the parameter a or b may be multiplied by a predetermined constant before being input to the subtracting circuit 122' and the adding circuit 123'.

Thirteenth Embodiment

Figure 22:
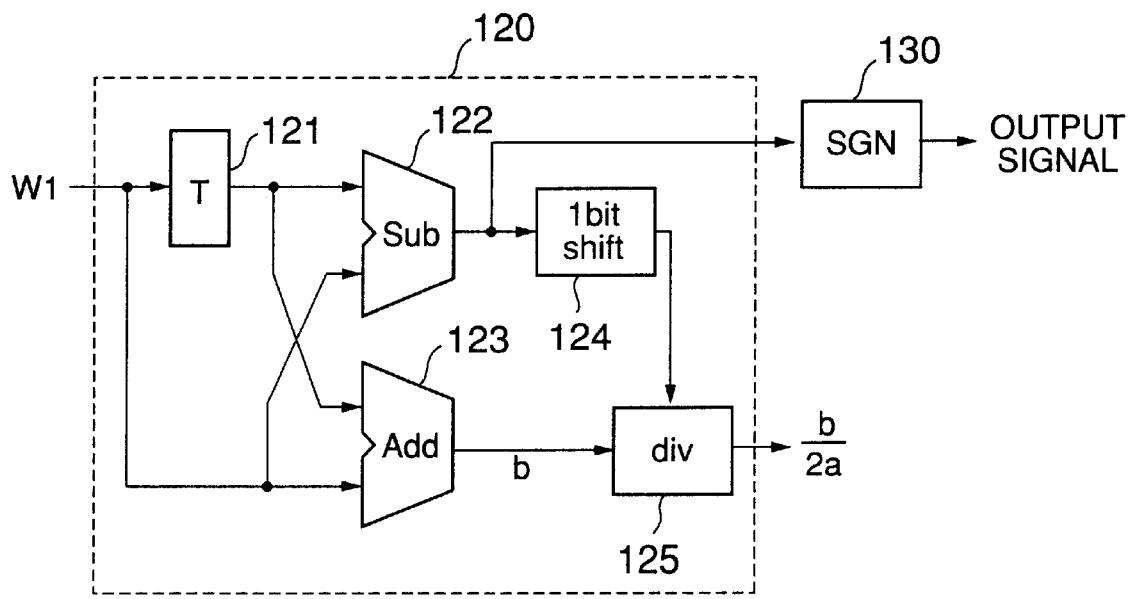
FIG. 22 is a circuit diagram showing a thirteenth embodiment of the present invention.

FIG. 22 is a circuit diagram showing a thirteenth embodiment of the present invention. In FIG. 22, parts that are the same as the parts shown in FIG. 18 are given the same reference numerals. In FIG. 22, the sign determining circuit 130 shown in FIG. 18 is provided so as to determine a curvature in the vicinity of the correlation peak. In this embodiment, the determining circuit determines a sign of the coefficient a of the quadratic term of the quadratic function. When the quadratic polynominal is used for the approximate function, a two-time differentiated value of the quadratic polynominal is 2a. Thus, a plus or minus sign of the correlation peak value can be detected by merely checking a sign of the coefficient a without determining the correlation peak time.

Fourteenth Embodiment

Figure 23:
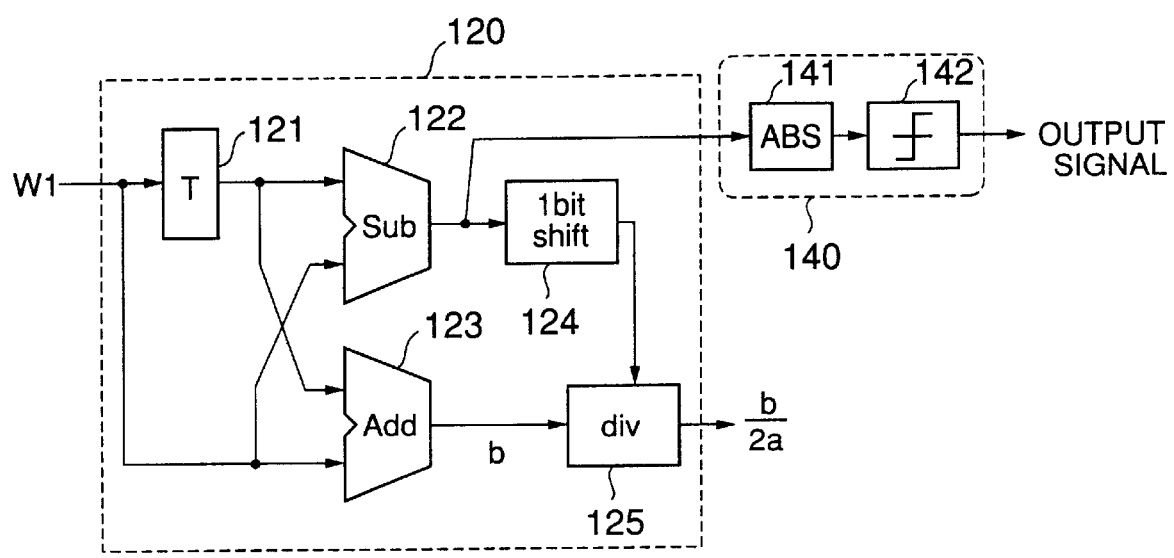
FIG. 23 is a circuit diagram showing a fourteenth embodiment of the present invention.

FIG. 23 is a circuit diagram showing a fourteenth embodiment of the present invention. In FIG. 23, parts that are the same as the parts shown in FIG. 20 are given the same reference numerals. The fourteenth embodiment shown in FIG. 23 is provided with the circuit 140 shown in FIG. 19. In this embodiment, the circuit 140 comprises an absolute value circuit 141 and threshold value determining circuit 142.

The absolute value circuit 141 calculates an absolute value of the coefficient a of a quadratic function which represents a curvature. Then, the threshold value determining circuit 142 determines that the correlation peak is present close to that time only when the absolute value of the coefficient a exceeds a threshold value $a_{th}$. At this time, the determinations of the curvature and the correlation peak time are not necessarily performed at the same time. For example, the absolute value of a is always determined and the correlation peak time may be detected only when presence of the correlation peak is detected according to the absolute value of a. This saves the power consumption of the circuit.

Fifteenth Embodiment

There is a case in which detection of the correlation peak value itself is required such as a case in which a phase of a carrier is obtained from the digital matched filter. In such a case, the correlation peak detecting method can be used.

Figure 24:
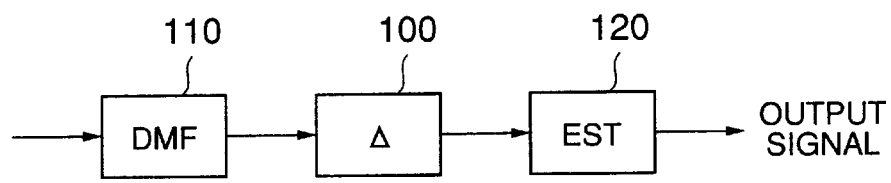
FIG. 24 is a block diagram of a part of a communication system according to a fifteenth embodiment of the present invention.

FIG. 24 is a block diagram of a structure of a fifteenth embodiment. In FIG. 24, parts that are the same with the parts shown in FIG. 16 are given the same reference numerals. In FIG. 24, a circuit 100 calculates a difference in the output signals of the digital matched filter 110. That is, the circuit 100 produces a differential signal $(y_i - y_{i-1})$ and inputs the differential signal to the circuit 120 so as to obtain the effect the same as that of the embodiment shown in FIG. 16.

The present invention is not limited to the specifically disclosed embodiments, and variations and modifications may be made without departing from the scope of the present invention.

The present application is based on the Japanese priority applications No.10-20846 filed on Feb. 2, 1998 and No.10-275511 filed on Sep. 29, 1998, entire contents of which are hereby incorporated by reference.

What is claimed is:

1. A peak detecting circuit for detecting a peak of a waveform of a time discrete signal, the peak detecting circuit comprising:

means for calculating a single approximate function that approximates a waveform of the time discrete signal;

means for estimating the peak of the waveform of said time discrete signal as being a calculated peak of the single approximate function; and a digital matched filter configured to generate said time discrete signal;

wherein a differential signal obtained from a sampled signal is input to said digital matched filter so that said digital matched filter generates and outputs said time discrete signal based on the differential signal.

2. The peak detecting circuit as claimed in claim 1, wherein plus or minus of a value of the peak of the time discrete signal is determined according to plus or minus of a curvature in the vicinity of the extremum of said single approximate function.

3. The peak detecting circuit as claimed in claim 1, wherein presence of the peak of said time discrete signal is determined according to an absolute value of a curvature at an extremum of said single approximate function.

4. The peak detecting circuit as claimed in claim 1, wherein said single approximate function is represented by a quadratic polynomial.

5. The peak detecting circuit as claimed in claim 4, wherein presence of the peak of said time discrete signal is determined according to a product of a sign of (a−b) and a sign of (a+b), where a is a coefficient of a quadratic term of said quadratic equation and b is a linear term of said quadratic function.

6. The peak detecting circuit as claimed in claim 4, wherein presence of the peak of said time discrete signal is determined according to an exclusive OR of a sign of (a−b) and a sign of (a+b), where a is a coefficient of a quadratic term of said quadratic equation and b is a linear term of said quadratic function.

7. The peak detecting circuit as claimed in claim 4, wherein a sign of a value of the peak of said time discrete signal is determined according to a sign of a coefficient of a quadratic term of said quadratic equation.

8. The peak detecting circuit as claimed in claim 4, wherein a detection of the peak time is performed only when an absolute value of a coefficient of a quadratic term of said quadratic equation exceeds a predetermined threshold value.

9. A peak detecting circuit for detecting a peak of a waveform of a time discrete signal, the peak detecting circuit comprising:

means for calculating a single approximate function that approximates the waveform of the time discrete signal;

means for estimating the peak of the waveform of said time discrete signal as being a calculated peak of the single approximate function; and a digital matched filter generating said time discrete signal;

wherein a differential signal is obtained from said time discrete signal output from said digital matched filter so that said single approximate function is calculated based on the differential signal.

10. A peak detecting circuit for detecting a peak of a waveform of a time discrete signal, the peak detecting circuit comprising:

means for calculating a single approximate function that approximates the waveform of the time discrete signal;

means for estimating the peak of the waveform of said time discrete signal as being a calculated peak of the single approximate function; and a digital matched filter generating said time discrete signal;

wherein a pseudo signal received via a communication medium is input to said digital matched filter so that said digital matched filter produces said time discrete signal that represents correlation values between the received pseudo noise signal and a predetermined pseudo noise signal comprising digital binary values; and wherein a differential signal obtained by sampling said received pseudo noise signal is input to said digital matched filter so that said digital matched filter produces and outputs said time discrete signal based on the differential signal.

11. A peak detecting circuit for detecting a peak of a waveform of a time discrete signal, the peak detecting circuit comprising:

means for calculating a single approximate function that approximates the waveform of the time discrete signal;

means for estimating the peak of the waveform of said time discrete signal as being a calculated peak of the single approximate function; and a digital matched filter generating said time discrete signal;

wherein a pseudo signal received via a communication medium is input to said digital matched filter so that said digital matched filter produces said time discrete signal that represents correlation values between the received pseudo noise signal and a predetermined pseudo noise signal comprising digital binary values; and wherein a differential signal is obtained from said time discrete signal output from said digital matched filter so that said single approximate function is calculated based on the differential signal.

12. A peak detecting circuit for detecting a peak of a waveform of a time discrete signal, the peak detecting circuit comprising:

a digital matched filter configured to output the time discrete signal;

first arithmetic means for calculating a single approximate function that approximates the waveform of the time discrete signal by receiving the time discrete signal from said digital matched filter, and by calculating parameters of the single approximate function by using input and output values of said digital matched filter as variables of said single approximate function;

second arithmetic means for estimating the peak of the waveform of said time discrete signal as a calculated peak of said single approximate function, and for calculating a peak time as a time when an extremum of said single approximate function appears; and third arithmetic means for calculating a phase difference between an output timing of said digital matched filter and an input timing of said digital matched filter.

13. The peak detecting circuit as claimed in claim 12, wherein:

said single approximate function is a quadratic function, and the parameters of the quadratic function are determined according to at least three coordinate values output from said digital matched filter.

* * * * *